April 20, 1954     J. P. GORMAN ET AL     2,676,044
ADJUSTABLE CLAMP FOR PAIRED TUBULAR MEMBERS
Filed Feb. 6, 1950

JOHN P. GORMAN
CHARLES D. MUNSELL
INVENTORS.

BY Alfred R. Fuchs
ATTORNEY.

JOHN P. GORMAN
CHARLES D. MUNSELL
INVENTORS.

BY Alfred R. Fuchs
ATTORNEY.

April 20, 1954 — J. P. GORMAN ET AL — 2,676,044
ADJUSTABLE CLAMP FOR PAIRED TUBULAR MEMBERS
Filed Feb. 6, 1950 — 3 Sheets-Sheet 3

JOHN P. GORMAN
CHARLES D. MUNSELL
INVENTORS.

BY Alfred R. Fuchs
ATTORNEY.

Patented Apr. 20, 1954

2,676,044

UNITED STATES PATENT OFFICE 2,676,044

ADJUSTABLE CLAMP FOR PAIRED TUBULAR MEMBERS

John P. Gorman and Charles D. Munsell, Kansas City, Mo.

Application February 6, 1950, Serial No. 142,626

4 Claims. (Cl. 287—54)

Our invention relates to adjustable clamps for clamping a pair of cylindrical members or tubular members together, and is particularly adapted for use in building up pipe frames, such as frames of scaffolds, although it has a general use wherever two pipes or other cylindrical pipe or rod-like members are to be clamped together against relative movement.

More particularly our invention comprises a pair of clamping members that have body portions that are substantially U-shaped in cross section, except that the same have flanges or wings thereon that are arcuate, said wings or flanges constituting base flanges that are secured together by suitable securing elements to secure the pair of members together in clamping relation to a pair of generally cylindrical or tubular members.

More specifically our invention comprises a clamping means comprising a pair of clamp portions of the above mentioned character that have U-shaped body portions that have channels or grooves therein that are substantially U-shaped and are approximately as deep as they are wide, that is, the maximum transverse diameter of the groove is approximately the maximum depth of the groove. The axis of this groove is a straight line.

It is a further particular purpose of our invention to provide a clamping means of the above mentioned character that can be adjusted so as to clamp two tubular or generally cylindrical or rod-like members together no matter what the angular relation of said members to each other may be, that is, they can be at any angle to each other from a right angular or perpendicular relationship to parallelism, and still be clamped together by our clamping means. This is accomplished by providing arcuate grooves in the base flanges of said members that are of sufficient length that clamping members, such as bolts, can be passed through said slots of the paired members and said members clamped together in any angular relationship of the channels therein to each other. Said arcuate slots are curved about an axis that intersects the longitudinal axis of the groove in each of said members at substantially the mid-point thereof and extends perpendicular to said longitudinal axis of the groove. It has been found that in order to make the adjustment above referred to possible, it is necessary that these arcuate grooves be considerably greater than 90° in length and, preferably, approach close to 120° in length. This is necessary in order that the slots will overlap sufficiently to receive the clamping elements, such as the bolts, through the overlapping portions of the slots when the paired members are so adjusted that the channels or grooves in the same will extend at right angles to each other.

It is another important purpose of our invention to provide clamping means of the above mentioned character that has at least one of the paired members provided with a clamping screw that is so mounted that it will clamp the one half of the apparatus or one member of each pair to the pipe or other similar member while the co-operating member of the pair is brought into clamping relation thereto, thus making it possible for the clamps to be put in position in clamping relation to a pair of members that are to be clamped to each other by one man, it being thus unnecessary to hold the member that has been clamped to the one tubular member or pipe while the other is being brought into position. While at least one of said clamping members should be provided with the above referred to clamping screw, both of the clamping members of the pair may be provided with such a clamping screw if this is desired in order to standardize the parts and make the halves of the clamp interchangeable.

Other objects and advantages of our invention will appear as the description of the drawings proceeds. We desire to have it understood, however, that we do not intend to limit ourselves to the particular details shown or described, except as defined in the claims.

Figure 10:
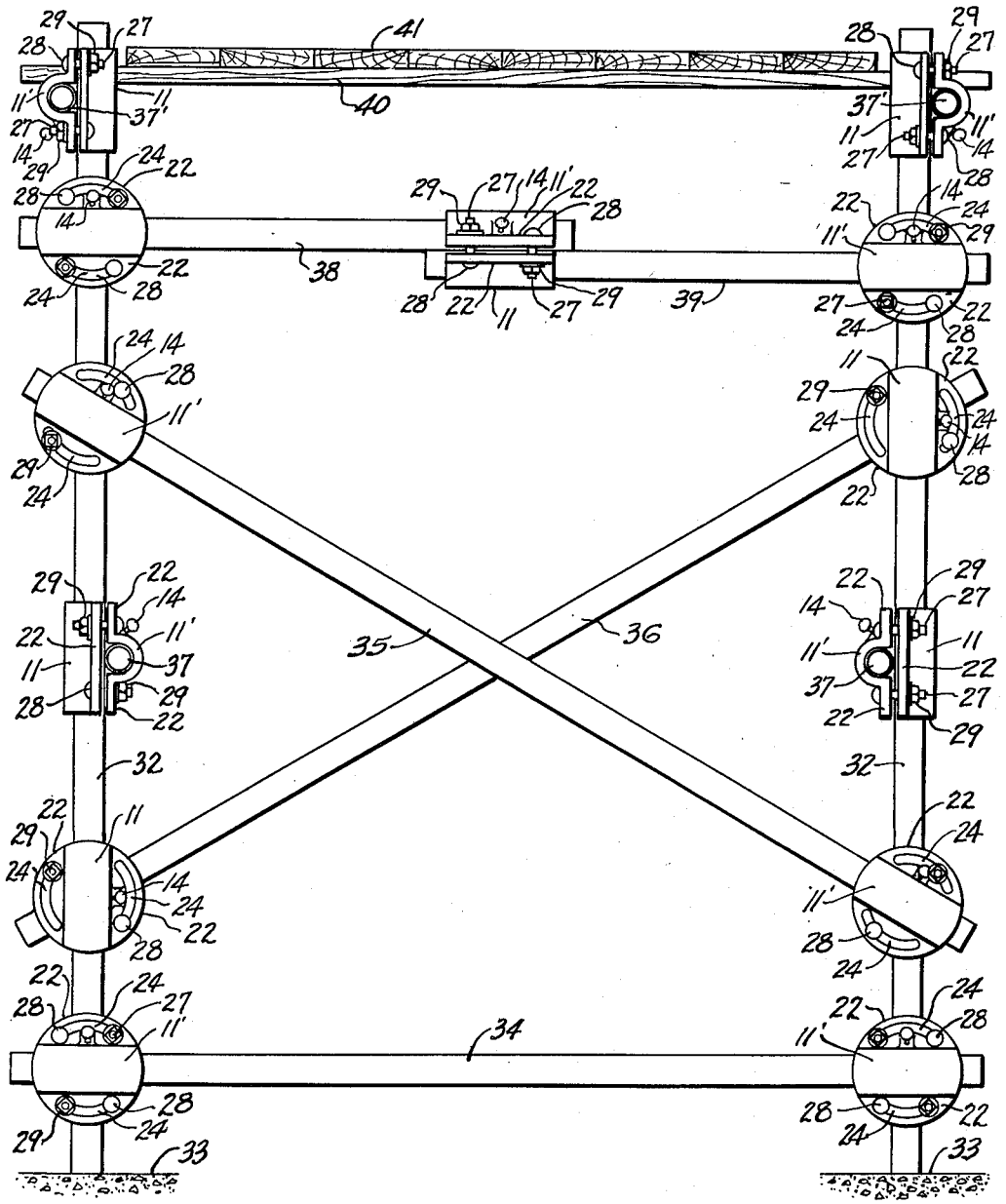
Figure 9:
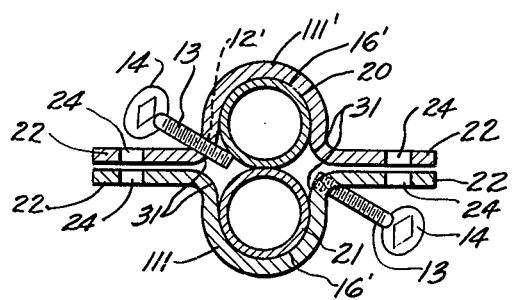

Fig. 9 is a similar view, showing a slightly modified form of clamping member with one member of the pair secured in position on a pipe or similar tubular member and the cooperating member brought into position for passage of the securing elements through the aligning slots in said members, and Fig. 10 is a side elevational view of a pipe frame, showing the clamping means applied to secure tubular members extending at various angles to each other together to form a pipe frame for a scaffold, platform or similar supporting means.

Figure 1:
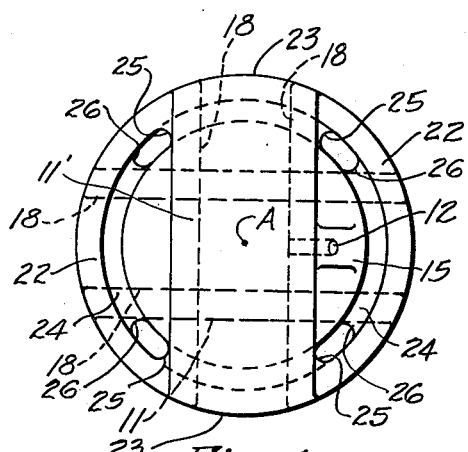
Fig. 1 is a face view of our improved clamping means detached, the fastening elements and clamping screws being omitted.
Figure 5:
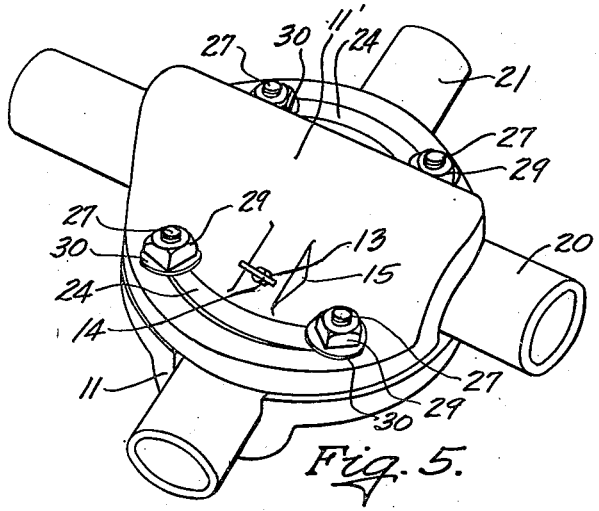
Fig. 5 is a perspective view showing the clamping means applied to a pair of pipes or tubular members extending perpendicularly to each other.

Referring in detail to the drawings, in Fig. 1 the clamp is shown with the parts thereof in substantially the position these would have in Fig. 5 when two pipes or tubular members are secured together extending at right angles to each other, with their axes in parallel planes. Said clamping means comprises a pair of body portions 11 and 11' that are U-shaped in cross section. The body portions 11 and 11' are alike, but are designated by the numerals 11 and 11' to distinguish between the same in the operation of the device. Each has an obliquely extending threaded opening 12 therein, which is adapted to receive a clamping screw 13 having the thumb piece 14 at the head end thereof. A reinforcement or fillet 15 is provided in the body portions at the point where the obliquely extending threaded opening 12 extends therethrough.

Figure 2:
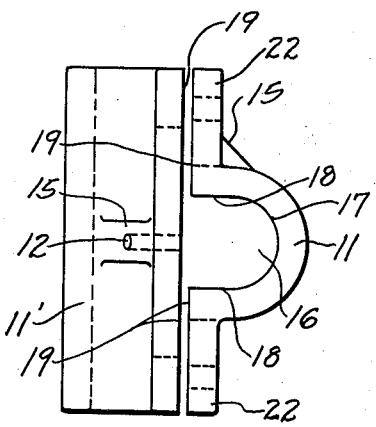
Fig. 2 is an edge view of said clamping means shown in Fig. 1.

Both of said body portions have U-shaped channels 16 therein. Said channels have curved bottom portions 17 that conform substantially to the curvature of the tubular member that is to be clamped within the same, and substantially straight side faces 18 that meet this arcuate or curved bottom wall in a manner clearly illustrated in Fig. 2. The maximum transverse diameter of each of the U-shaped channels 16 is that of the distance between the walls 18, which is also substantially the outside diameter of the tubular member to be received in the groove or channel 16. The maximum depth of the groove or channel 16 from the flat outer face 19 of the member 11 or 11' to the bottommost or most remote point from said flat face 19 of the arcuate portion 17 is approximately the maximum transverse diameter of the groove 16, but slightly less than said maximum transverse diameter so that when tubular members are clamped between a pair of said members 11 and 11' as shown for the tubular members 20 and 21 in Fig. 3, said faces 19 will not be in engagement with each other so that the securing elements that are utilized for clamping the two members 11 and 11' of a clamp to the tubular members and thus the tubular members to each other, will exert their clamping pressure directly on the tubular members.

Each of said body portions further has an arcuate or curved base flange 22 thereon, on each side thereof. The flat faces 19 extend into said base flanges, as will be obvious from Figs. 2, 3 and 4. It will also be noted that in order to maintain the circular contour of the base portion of each of said clamps, the ends 23 of the U-shaped body portions are curved on the same arc as the flanges 22, as will be obvious from Fig. 1. Thus no matter what the adjustment of the members 11 and 11' relative to each other, these members will have no lateral projections on one thereof extending beyond the other thereof, thus avoiding the projection of any parts that may catch on the clothing or injure anyone that might come in contact therewith. Each of said body portions 11 and 11' thus presents a saddle-like appearance, with wings or flanges 22 thereon that are arcuate, and a longitudinally extending outwardly bowed body portion 11 or 11' that is U-shaped in cross section and has a U-shaped channel 16 that extends the full length of said body portion.

Each of said flanges 22 is provided with an arcuate slot 24, which is concentric with the curved outer edge of each of said flanges 22, said arcuate slots of said flanges being curved about an axis indicated at A, which is common to both of the members of the pair and which extends perpendicularly to the longitudinal axis of each of the channels 16 no matter what adjustment the members may have relative to each other. Thus the adjustment of the members 11 and 11' relative to each other is always about the axis A as a center, the axis being indicated by a dot in Fig. 1 inasmuch as it is perpendicular to the plane from which Fig. 1 is viewed. In order to more clearly show the overlap of the slots 24 when the parts are in the position shown in Fig. 1, the ends of the slots are indicated by different reference numerals. Thus the ends of the slots in the member 11', which is the uppermost member as viewed in Fig. 1, are indicated by the numeral 25, while the ends of the slots in the lower member as viewed in Fig. 1, which is the member 11, are indicated by the numeral 26. It will be obvious that even in the position shown in Fig. 1, which is one extreme position of the parts, the ends 25 and 26 of the overlapping slots 24 are spaced sufficiently apart that securing elements, such as the bolts 27 shown in Fig. 3, having heads 28 and provided with nuts 29 having screw-threaded engagement with said bolts and preferably having washers 30 mounted between said nuts and one of the ears or flanges 22, can be passed through the overlapping portions of the slots to clamp the parts in the position shown in Fig. 5.

Figure 3:
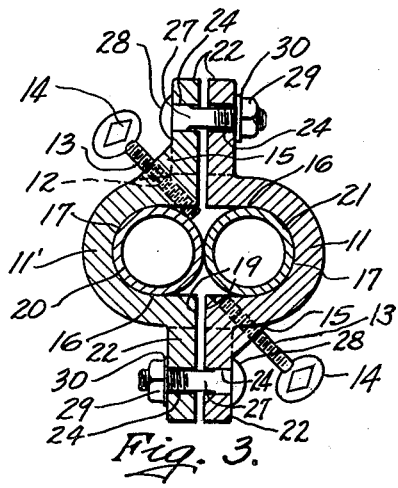
Fig. 3 is a transverse sectional view through the clamping means, showing the same in position on a pair of tubular members or pipes, clamping the same together.
Figure 4:
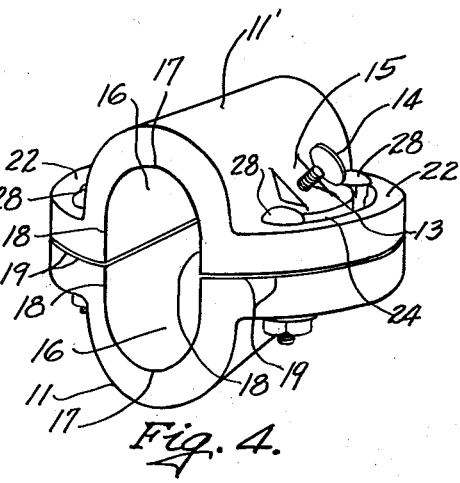
Fig. 4 is a perspective view of the clamp adjusted to position for clamping a pair of pipes or cylindrical members in parallel relationship, the pipes or members to be clamped being omitted.
Figure 8:
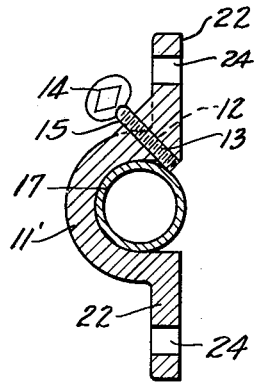
Fig. 8 is a transverse sectional view, showing one of the clamping members secured in position on a pipe or similar tubular member.

It will be noted that the screw-threaded opening 12 extends at an oblique angle such that when the screw 13 is tightened up with the clamp half 11' in position on the tubular member 20, as shown in Fig. 8, the tubular member will be held in position on the pipe 20 because the pipe is confined between the curved bottom 17 of the groove 16 and the inner end of the member 13. The cooperating member 11 can then be brought into the position shown in Fig. 3 and the securing elements 27 inserted through the aligning slots 24 without any necessity of holding the clamping half 11' on the pipe 20. This makes it possible for one man to put the clamp in position no matter how large the tubular members may be that are being clamped by a clamp of this character. The clamp half 11 may also be clamped to the pipe or tubular member 21 with the clamping screw 13 thereof, if convenient to hold it in position for insertion of the bolts 27, or may be left in a retracted position as shown in Fig. 3.

In Fig. 5 the clamping elements 11 and 11' are shown with their body portions turned at right angles to each other and with the tubular members 20 and 21 extending perpendicular to each other in parallel planes. The various parts above described are provided with similar reference numerals in Fig. 5 as in Figs. 1 to 4, inclusive.

Figure 6:
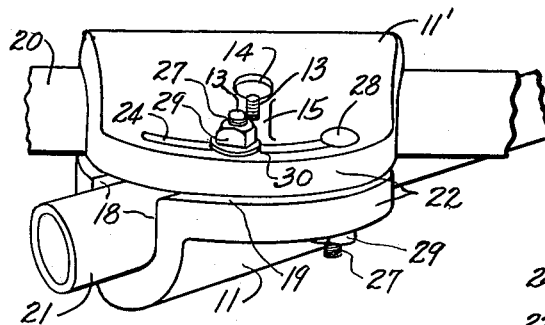
Fig. 6 is a similar view, showing the clamping means adjusted for clamping a pair of pipes to each other at an oblique angle.

In Fig. 6 the members 11 and 11' are shown extending at an oblique angle to each other with the tubular members 20 and 21 extending at a similar oblique angle in parallel planes. The same reference numerals are applied to corresponding parts in Fig. 6 as in Figs. 1 to 4, inclusive. It is immaterial whether the bolts are put through the member 11 or 11', first, as will be obvious from a comparison of Figs. 4, 5 and 6.

Figure 7:
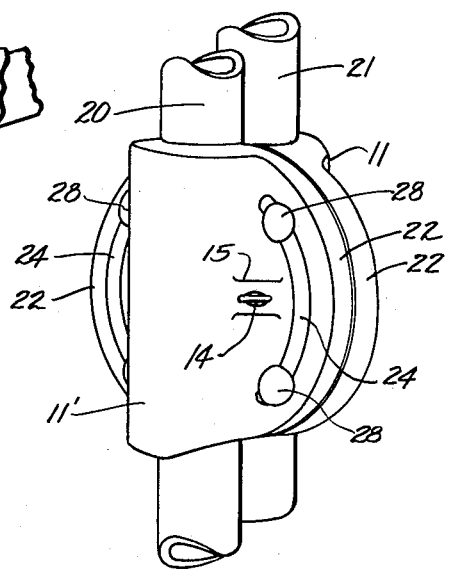
Fig. 7 is a perspective view showing a pair of parallel pipes clamped to each other by our clamping means.

In Fig. 7 the clamp members 11 and 11' are shown with their grooves in alignment with each other and with the tubular members 20 and 21 arranged in parallelism, this being the other extreme position of the parts from that shown in Fig. 5. The same reference numerals are applied to corresponding parts in Fig. 7 as in Figs. 1 to 4, inclusive. It will be noted that in all figures of the drawings above described, where the clamp parts are shown in assembled relation, they are shown as being spaced from each other at their base flanges. This spacing is somewhat exaggerated in the drawings, but obviously the faces 19 must not engage with each other if the bolts 27 are to be effective in tightly clamping the pipes 20 and 21 to each other. While pipes are shown, obviously other cylindrical members, such as rods, could also be clamped together in a similar manner.

In Fig. 9 a slight modification of the invention is shown, the clamp parts being shown in their relative position for clamping the two pipes 20 and 21 together. However, the clamp halves 111 and 111' are made of heavy gauge sheet metal or steel plates and bent to the shape shown in dies or similar members and provided with the slots 24 as previously described. The flanges are the same as previously described. The flanges 22 are the same as previously described and the only marked difference between the clamp shown in Fig. 9 and that shown in the other figures is that there is a slight rounding at the mouth portion of the groove at 31 in Fig. 9, this being due to the die shaping of the parts. The maximum depth of the groove 16', however, is the same as that of the groove 16 and the shape thereof is similar except for the rounding at 31. Furthermore this maximum depth is approximately the maximum diameter of the groove immediately below the rounding corners 31, but slightly less than that to permit the above referred to clamping action of the bolts that pass through the slots 24.

The clamping screw 13 is the same as previously described, but the screw-threaded opening 12' in the member 111' extends only through the thickness of the material of the clamping member 111', there being no fillet provided as in the cast form of clamp. Aside from that the arrangement and operation of the clamping screw 13 is the same as previously described, and the clamped parts are mounted on the pipes in the same manner, by first mounting the clamp half 111' in position, adjusting the screw 13 and then bringing the clamp half 111 in the position shown in Fig. 9.

In Fig. 10 a pipe frame is shown that is made up of tubular members or pipes and the clamping members that form the subject matter of our invention. While only a fragmentary portion of such a pipe frame is shown, the application of the clamping members to a pipe frame having members that have various angular relationships to each other is illustrated therein. A pair of vertically extending pipes 32 is shown, on which a plurality of the clamping members are mounted. The lower ends of said vertically extending pipes 32 are mounted on a suitable support, such as a concrete floor 33 and a lower horizontally extending pipe 34 forming a horizontal frame member is shown as being secured to a pair of the vertically extending members 32 by means of a pair of our clamps. The frame made up of the tubular members or pipes is also provided with diagonally extending bracing members 35 and 36 made of tubing or pipe. The member 35, it will be noted, is forwardly of the member 36 and a pair of our clamps are utilized for securing said member 35 to the vertically extending members 32. Similarly the diagonally extending member 36 is secured to the members 32 by means of our clamping members. The clamping members that are used for clamping the member 36 to the members 32 have the halves thereof that receive the member 36 on the remote side of the vertical members 32, while the clamp halves that receive the members 35 are on the near sides of the vertical members so that said members 35 and 36 will not in any manner interfere with each other where these pass. Obviously the clamping members that secure the vertical members 32 and the obliquely extending members 35 and 36 to each other are arranged at an oblique angle to each other, as shown in Fig. 6, and it will be obvious that the angularity of the members 35 and 36 can be varied as may be found desirable, as any oblique angular arrangement of the members 35 and 36 to the vertical members or columns 32 can be provided by adjustment of our clamping members.

Between the connections of the diagonal members 35 and 36 with the vertical members 32 are located clamping members that secure the horizontal pipes or tubular members 37 to said vertical members, the pipes or tubular members 37 extending in a direction perpendicular to that of the member 34. Another pair of horizontal members 37' is shown at the upper ends of the vertical members 32 secured thereto in a similar manner, but on the outer or remote sides thereof rather than on the inner sides thereof. Except for that the mounting of the clamping means is the same as for clamping the members 37 in position. If the tubular members terminate between adjacent vertical members 32, or for any other reason a pair of tubular members are to be connected together in parallelism, then the arrangement shown for the tubular members 38 and 39 is utilized, in which the clamping members that secure the members 38 and 39 to the vertical tubular members 32 are arranged in a similar manner and secure said members together in a similar manner to that in which the clamping members secure the member 34 to the vertical members 32. However, the members 38 and 39 are slightly overlapped so that these can be secured together by our clamping device to make a continuous horizontal member of said members 38 and 39, the clamping members being in this case arranged substantially in the manner shown in Figs. 4 and 7. The clamping members that secure the members 34 and 32 together, the members 37 and 32 together, the members 37' and 32 together, the members 38 and 32 together, and the members 39 and 32 together are all arranged in substantially the manner shown in Fig. 5.

Any suitable platform means may be provided on a framework of this character and it may be continued either lengthwise, crosswise or vertically to any desired extent by the use of the clamping members in the manner illustrated. The platform means that is shown in the drawings comprises longitudinal supporting members 40 on which suitable floor boards 41 are mounted, the members 40 being mounted on the horizontal tubular members 37' in the structure illustrated in Fig. 10. Various other structures can be built up of rod-like or tubular members and our clamping means, or said clamping means can be used for securing pipe-like or rod-like members together that are not parts of framework, but are merely to be secured in fixed position relative to each other.

What we claim is:

1. A device for clamping a pair of cylindrical members to each other in direct clamping contact, comprising a pair of substantially circular duplicate saddle shaped body portions each having a transverse outwardly bowed major portion U-shaped in cross section and a pair of wings providing arcuate base flanges thereon on each side of said U-shaped portion, said U-shaped portion providing a channel having straight parallel side wall portions and a cylindrical curved bottom portion, said base flanges each having an arcuate slot therein extending through an arc approaching that of said flange with the ends thereof adjacent said outwardly bowed portion, and clamping means extending through said slots to clamp cylindrical members mounted in said body portions to each other and said body portions to each other with the flanged sides thereof toward each other and in adjacency.

2. A device for clamping a pair of cylindrical members to each other in direct clamping contact, comprising a pair of substantially circular duplicate saddle shaped body portions each having a major portion having a U-shaped channel therein that has a maximum depth slightly less than the maximum width thereof and a pair of arcuate base flanges thereon on each side of said U-shaped portion, said base flanges each having an arcuate slot therein extending through an arc approaching that of said flanges with the ends thereof adjacent said channeled major portion, and a pair of clamping members extending through each of said slots to clamp cylindrical members mounted in said channels to each other between said body portions and said body portions to each other with the flanged sides thereof toward each other and in adjacency.

3. A device for clamping a pair of cylindrical members to each other in direct clamping contact, comprising a pair of body portions each having an outwardly bowed major portion U-shaped in cross section to provide a channel therein, said channel having a maximum depth slightly less than the maximum width thereof and each body portion having an arcuate slot therein each extending through an arc of approximately 120 degrees, and a pair of clamping members extending through each of said slots to clamp cylindrical members mounted in said channels to each other between said body portions and said body portions to each other with the flanged sides thereof toward each other.

4. A device for clamping a pair of cylindrical members to each other in direct clamping contact, comprising a pair of substantially circular duplicate saddle shaped body portions each having a transverse outwardly bowed major portion U-shaped in cross section and a pair of wings providing arcuate base flanges thereon on each side of said U-shaped portion, said U-shaped portion providing a channel having straight parallel side wall portions and a cylindrical curved bottom portion, said base flanges each having an arcuate slot therein extending through an arc approaching that of said flange with the ends thereof adjacent said outwardly bowed portion, and clamping means extending through said slots to clamp cylindrical members mounted in said body portions to each other and said body portions to each other with the flanged sides thereof toward each other and in adjacency, one of said body portions having means extending into the channel therein adjacent its open side and cooperating with the cylindrical bottom wall thereof to secure the same to a tubular member independently of the other body portion.

References Cited in the file of this patent

UNITED STATES PATENTS

| Number | Name | Date |
|---|---|---|
| 1,190,502 | Anderson | July 11, 1916 |
| 1,486,158 | Price | Mar. 11, 1924 |
| 1,706,215 | Davidson | Mar. 19, 1929 |
| 2,450,147 | Lawry | Sept. 28, 1949 |
| 2,575,917 | Johnson | Nov. 20, 1951 |

FOREIGN PATENTS

| Number | Country | Date |
|---|---|---|
| 435,761 | Great Britain | of 1935 |
| 600,431 | Great Britain | of 1948 |